United States Patent [19]
Liao et al.

[11] Patent Number: 6,070,360
[45] Date of Patent: Jun. 6, 2000

[54] PLANT CULTIVATING BASIN

[76] Inventors: Chi-Wei Liao; Cheng-Fang Liao; Cheng-Chin Liao; Cheng-Te Liao, all of No. 42, Ln.8, KaoShuang Rd., PingChen City, TaoYuan, Taiwan

[21] Appl. No.: 09/185,591

[22] Filed: Nov. 4, 1998

[51] Int. Cl.[7] .................................................. A01G 25/00
[52] U.S. Cl. .................................. 47/80; 47/65.5; 47/79; 47/81
[58] Field of Search ................................ 47/65.5, 64, 80, 47/59, 79, 81; 211/85.23, 88.03

[56] References Cited

U.S. PATENT DOCUMENTS

| | | | |
|---|---|---|---|
| 681,672 | 9/1901 | Andrews | 47/80 |
| 1,775,831 | 9/1930 | Salisbury | 47/80 |
| 1,995,217 | 3/1935 | Nelson | 47/80 |
| 2,344,794 | 3/1944 | Vallinos | 47/80 |
| 3,058,263 | 10/1962 | Reynolds | 47/80 |
| 3,220,144 | 11/1965 | Green | 47/80 |
| 3,769,748 | 11/1973 | Goldring | 47/80 |
| 4,096,663 | 6/1978 | Silver | 47/80 |
| 4,356,665 | 11/1982 | Oliveira | 47/80 |
| 4,797,217 | 1/1989 | Cleverley | 508/401 |
| 4,991,346 | 2/1991 | Costa, Jr. et al. | 47/80 |
| 5,172,516 | 12/1992 | Maillefer | 47/80 |

*Primary Examiner*—Peter M. Poon
*Assistant Examiner*—Judith A. Nelson
*Attorney, Agent, or Firm*—Dougherty & Troxell

[57] ABSTRACT

A plant cultivating basin includes a basin containing a perforated conical cap located inside for holding soil and plants. The basin has a bottom opening and is placed upon a water container which has a side water funnel and water inlet to receive water. Fibrous roots of plants may pass through perforated cap to reach water container for water needed. The plant may grow without a lot of human care and attention.

1 Claim, 3 Drawing Sheets

PLANT CULTIVATING BASIN

BACKGROUND OF THE INVENTION

FIELD OF THE INVENTION

This invention relates to a plant cultivating basin and particularly to a self-contained plant cultivating basin which enables plants to grow with little human attention.

Potted planting is quite popular nowadays. Some plants such as watermelon, grape and fruits need a lot of water and specific environments and conditions to grow. Many people do not have time needed to tend these plants. It is therefore an object of this invention to provide a plant cultivating basin that has a self-contained environment allowing a plant to grow with least amount of human attention.

SUMMARY OF THE INVENTION

The plant cultivating basin according to this invention includes a basin, a perforated conical cap and a water container. The perforated conical cap is located in the basin with soil filled in the basin but above the cap. A plant is planted in the basin and above the cap. Then the basin is placed upon the water container in which water is filled. Fibrous roots of the plant will be able to grow downward and pass through the perforated cap and reach the water container to get water needed. This invention thus allows plants to grow with minimum amount of human care and attention.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
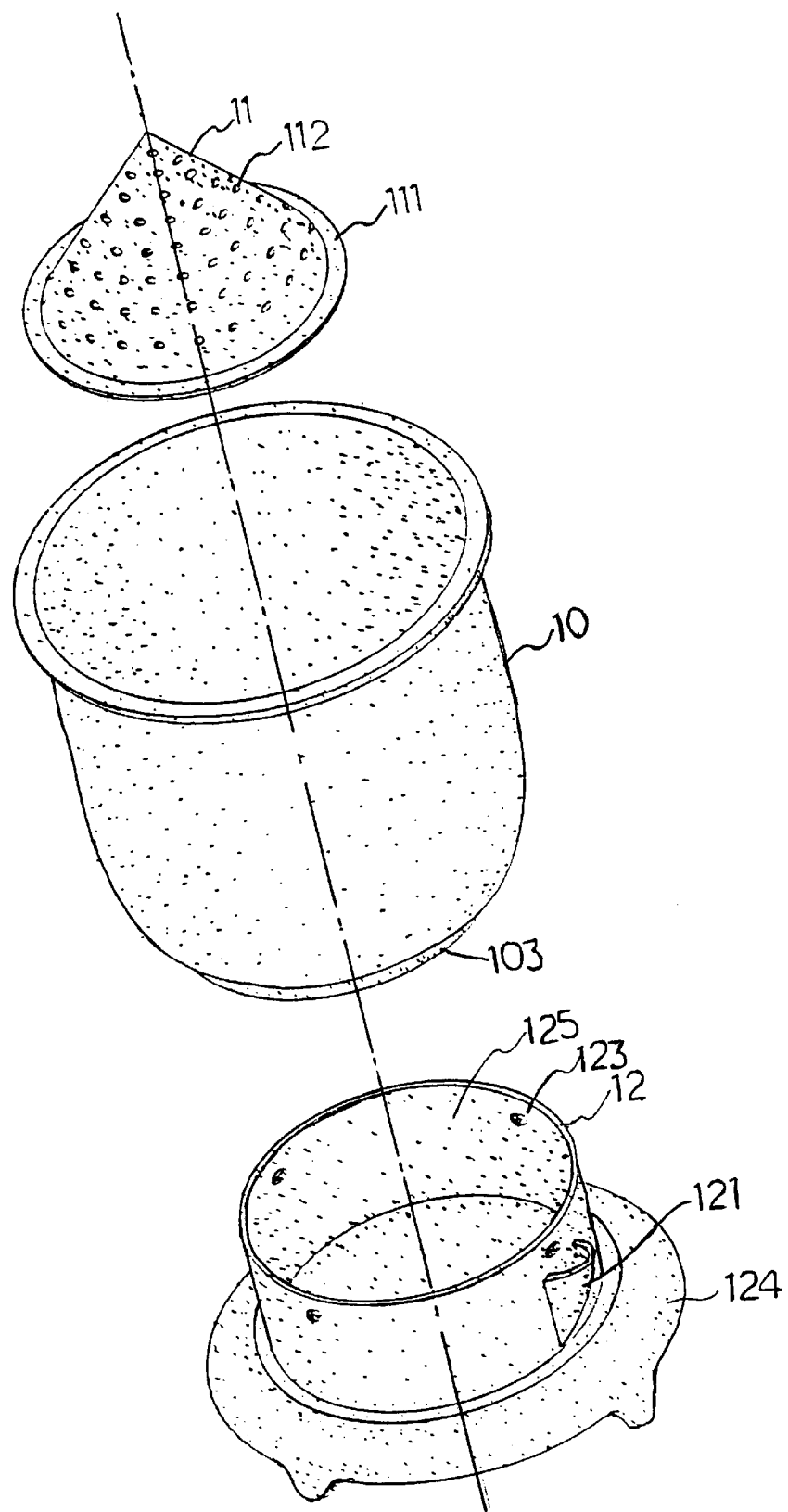
FIG. 1 is an exploded perspective view of this invention.
Figure 2:
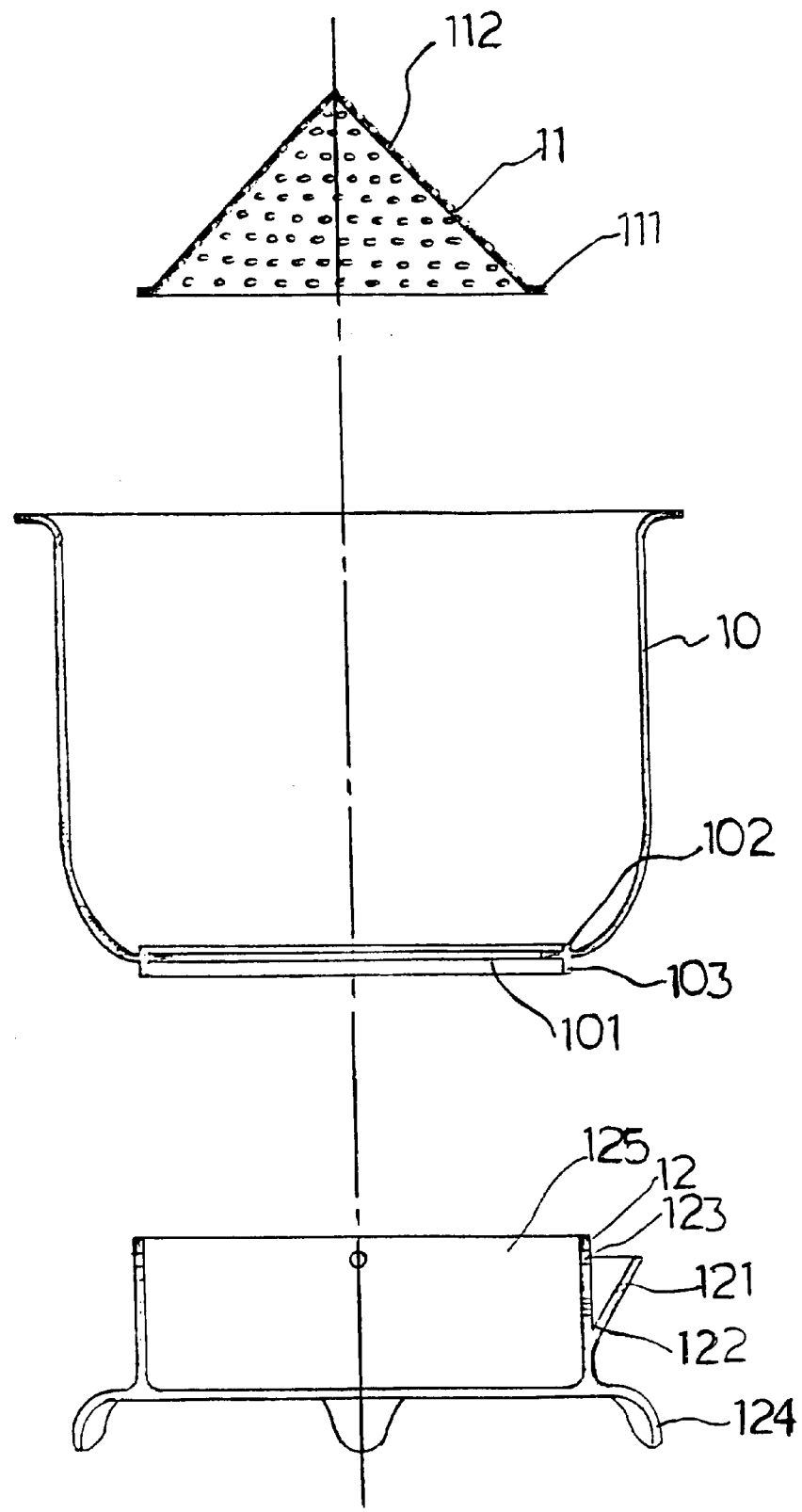
FIG. 2 is exploded sectional view of this invention.
Figure 3:
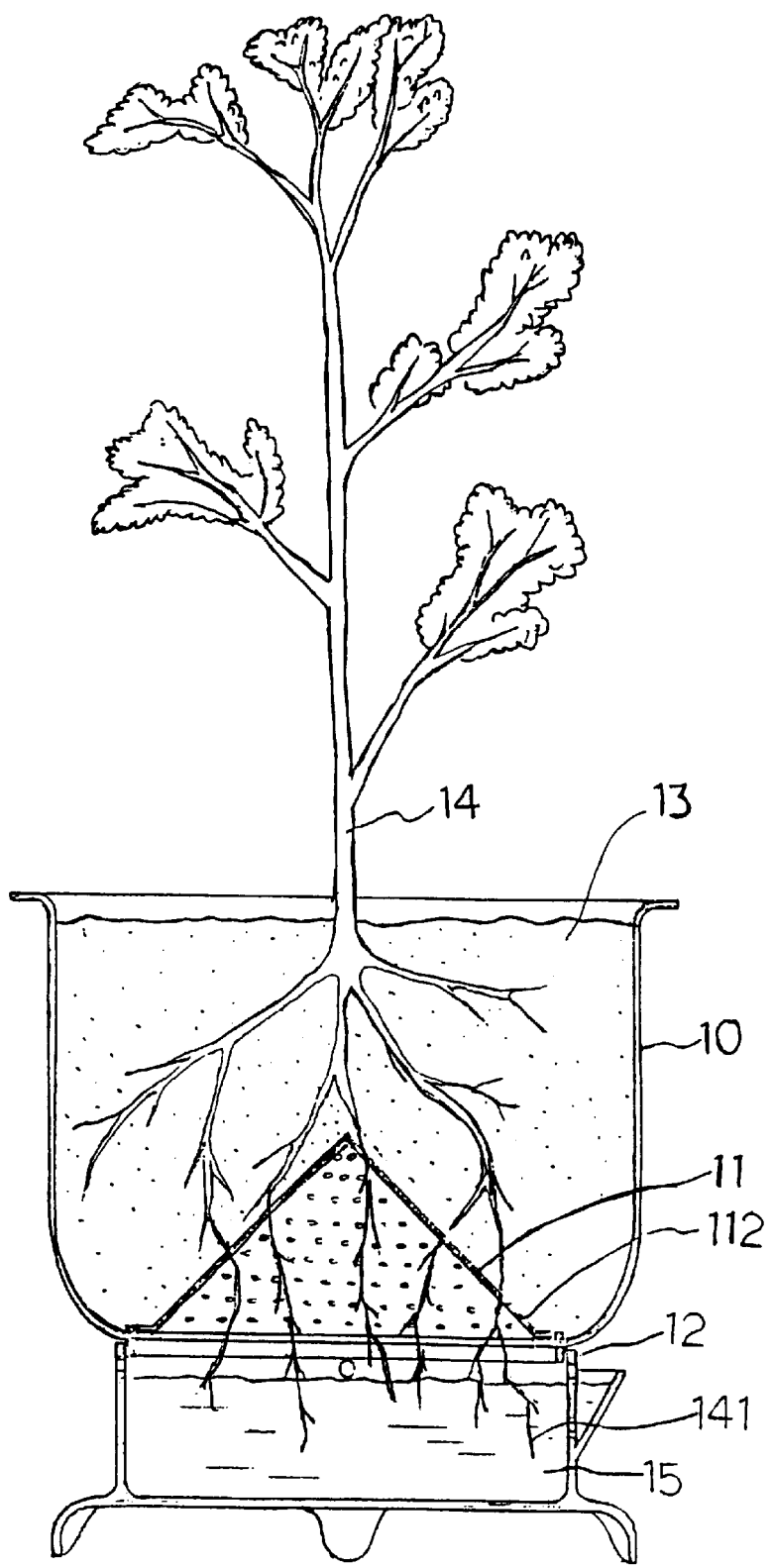
FIG. 3 is a sectional view of this invention in use.

Referring to FIGS. 1 and 2, this invention includes a basin 10, a perforated conical cap 11 and a water container 12. The basin 10 has an opening 101 (round or other shape desired) at the bottom. Around and above the opening 101 is an annular upper ring 102. Around and below the opening 101 is an annular bottom ring 103. Both rings 102 and 103 have larger diameter than the opening 101. The conical cap 11 has a plural number of apertures 112 formed in the conical surface and an annular flange 111 at the bottom edge which may fit into the upper ring 102. The water container 12 includes a water reservoir 125 which has a top opening, a plural number of air inlets 123 at the lateral wall, a water funnel 121, a water inlet 122 formed in the lateral wall within the water funnel 121 extending from the lateral wall and a plural number of supporting legs 124 at the bottom thereof. The basin 10 is placed upon the water container 12 with the bottom ring 103 held within the top opening of the water reservoir 125 (shown in FIG. 3). Water 15 may be poured into the water reservoir 125 through the funnel 121 and water inlet 122.

When soil 13 is filled into the basin 10, a plant 14 may be planted in the basin 10. The fibrous roots of the plant may pass through the apertures 112 of the conical cap 11 and reach into the water reservoir 125 to get water needed. The air inlets 123 enables air circulation to the plant to help it grow properly. A mesh screen may also be provided to cover the air inlets 123 to prevent insects or mosquito wrigglers from entering into the water container. Once the water container 12 has been filled with water, the basin of this invention may enable the plant 14 to grow without a lot of human care or attention for a long period of time.

What is claimed is:

1. A plant cultivating basin comprising:
   a basin filled therein soil for planting plant having an opening at bottom, an annular upper ring above the opening and an annular bottom ring below the opening, the upper ring and the lower ring having larger diameters than the opening;
   a perforated conical cap located in the basin having an annular bottom flange engageable with the upper ring, and
   a water container having a water reservoir surrounded by lateral walls which have a plural number of air inlets formed therein, a water funnel attached to the lateral wall, a water inlet formed in the lateral wall within the water funnel, the water reservoir having a top opening and a plural number of legs at a bottom thereof
   wherein the basin is supported by the water container by engaging the bottom ring with the top opening of the water reservoir.

* * * * *